(12) United States Patent
Oxley et al.

(10) Patent No.: US 7,054,641 B1
(45) Date of Patent: May 30, 2006

(54) COMMUNICATIONS SYSTEM LOAD CONTROL METHODS AND APPARATUS

(75) Inventors: Derek Alan Oxley, Chandler, AZ (US); Thomas Peter Emmons, Jr., Mesa, AZ (US); Israel Arieh Cimet, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 859 days.

(21) Appl. No.: 10/070,845

(22) PCT Filed: Jun. 26, 2000

(86) PCT No.: PCT/US00/17501

§ 371 (c)(1),
(2), (4) Date: Mar. 11, 2002

(87) PCT Pub. No.: WO01/20943

PCT Pub. Date: Mar. 22, 2001

Related U.S. Application Data (60) Provisional application No. 60/153,620, filed on Sep. 13, 1999.

(51) Int. Cl.
*H04Q 7/20* (2006.01)
*H04Q 7/36* (2006.01)

(52) U.S. Cl. ............. 455/453; 455/450; 455/509; 455/13.1; 455/511; 455/512; 455/422.1; 455/11.1; 370/329; 370/330; 370/315; 370/316; 370/324; 370/326

(58) Field of Classification Search ............. 455/453, 455/450, 452.1, 452.2, 446, 3.03, 422.1, 455/509, 3.01, 511, 502, 512, 515, 500, 517, 455/524, 525, 427, 430, 12.1, 13.1, 13.2, 455/405, 447, 550.1, 11.1; 370/329, 330, 370/337, 315, 316, 321, 324, 326

See application file for complete search history.

(56) References Cited

U.S. PATENT DOCUMENTS

| | | | | |
|---|---|---|---|---|
| 5,530,917 A | * | 6/1996 | Andersson et al. | ......... 455/436 |
| 5,844,894 A | * | 12/1998 | Dent | ......................... 370/330 |
| 6,091,936 A | * | 7/2000 | Chennakeshu et al. | .... 455/63.3 |
| 6,381,228 B1 | * | 4/2002 | Prieto et al. | ................ 370/323 |

* cited by examiner

*Primary Examiner*—Keith Ferguson (57) ABSTRACT

A communication system (100) includes an aircraft (120) that acts as a repeater between ground equipment (101) and communication units (128) on the ground. The ground equipment (101) includes multiple base transceiver stations (104, 106, 108) that provide traffic channels, control channels, and access channels. The channels are all in a single beam (124) projected from aircraft (120). Relative loading on access channels is influenced by access class lists (200, FIG. 2) assigned to control channels. Access classes can be transferred from one list to another, or they can be removed from a list. Relative loading of traffic channels on the base transceiver stations is influenced by assigning different time offsets to base transceiver station so that calls can be transferred from one base transceiver station to another.

20 Claims, 5 Drawing Sheets

FIG. 1

| CONTROL CHANNEL | ACCESS CLASS LIST |
|---|---|
| 1 | 1, 2, 3 |
| 2 | 4, 5, 6 |
| 3 | 7, 8, 9, 10 |

FIG. 2

| CONTROL CHANNEL | ACCESS CLASS LIST |
|---|---|
| 1 | 1, 2, 3, 4, 5, 6, 7, 8, 9, 10 |
| 2 | 4, 5, 6, 7, 8, 9, 10, 1, 2, 3 |
| 3 | 7, 8, 9, 10, 1, 2, 3, 4, 5, 6 |

COMMUNICATIONS SYSTEM LOAD
CONTROL METHODS AND APPARATUS

CROSS REFERENCE TO RELATED
APPLICATION

The present application is related to, and claims priority from, provisional patent application Ser. No. 60-153,620, entitled Wireless AERO Solutions for Communications Networks, filed on Sep. 13, 1999, the contents of which are incorporated herein by reference.

FIELD OF THE INVENTION

The present invention relates generally to communications systems and, in particular, to the control of loading in communications systems.

BACKGROUND OF THE INVENTION

Cellular communications systems have varying capacities. Some areas served by fixed cellular services have limited coverage. Others are not served by fixed cellular services at all. Typically, when more capacity is desired in areas with existing coverage, existing cell sites are divided into a larger number of sectors. The additional sectors can reuse resources such as frequency channels, but they are limited geographically to areas surrounding existing cell sites. When demand increases at a distance from existing cell sites, additional cell sites can be installed. These approaches to increasing capacity take time, in part because equipment needs to be added, and additional cell sites may need to be secured and towers may need to be built.

Cell sites and sectors can also be modified to evenly distribute the call load between them. This may be desirable when different cell sites and sectors within cell sites experience different loading. For example, two adjacent cell sites may have widely varying call loads based on their relative location. If one is closer to a densely populated area or freeway, it may experience a higher volume of calls. High call loads on a cell or a sector of a cell can be relieved by adding an additional cell, or by dividing an existing cell into a greater number of sectors. Both of these techniques typically require additional equipment and installation time.

Accordingly, a significant need exists for methods and apparatus for providing cellular services a distance away from existing cell sites, and for modifying and distributing loading between different communications resources.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and wherein:

DETAILED DESCRIPTION OF THE DRAWINGS

In the following detailed description, reference is made to the accompanying drawings that show, by way of illustration, specific embodiments in which the invention may be practiced. It is to be understood that other embodiments may be utilized and structural changes may be made without departing from the scope of the present invention.

The methods and apparatus of the present invention provide an efficient mechanism to provide cellular communications services using an airborne transceiver. The airborne transceiver projects a beam onto the earth, and communication units within the beam can communicate therewith. The footprint created by the beam can be large, especially when the elevation angle from the footprint to the airborne transceiver is small. Multiple cellular sectors are overlayed in a single beam, and various load sharing methods and apparatus are used to distribute the call load between sectors.

Multiple base transceiver stations, one for each sector, are used to provide cellular communications channels within the beam footprint. Multiple control channels and access channels are also used. Load sharing between the access channels is provided by the assignment of access classes to control channels. Each communication unit is assigned an access class. Communication units perform requests for service on access channels that are associated with control channels having the corresponding access class enabled. Access class assignments can be modified to influence relative loading on the access channels.

In one embodiment, load sharing between base transceiver stations is accomplished by assigning each a time offset. The time offset determines a time location of a receive time window within which the base transceiver station monitors the access channels for a call request. When the beam footprint is large, each base transceiver station monitors a portion of the footprint. Base transceiver stations with small offsets monitor closer portions, and base transceiver stations with larger offsets monitor portions farther away. Receive time windows can overlap, and time offsets can be modified to alter the size of overlap regions. Calls to and from communication units in overlap regions can be transferred from one base transceiver station to another to distribute the call load.

Figure 1:
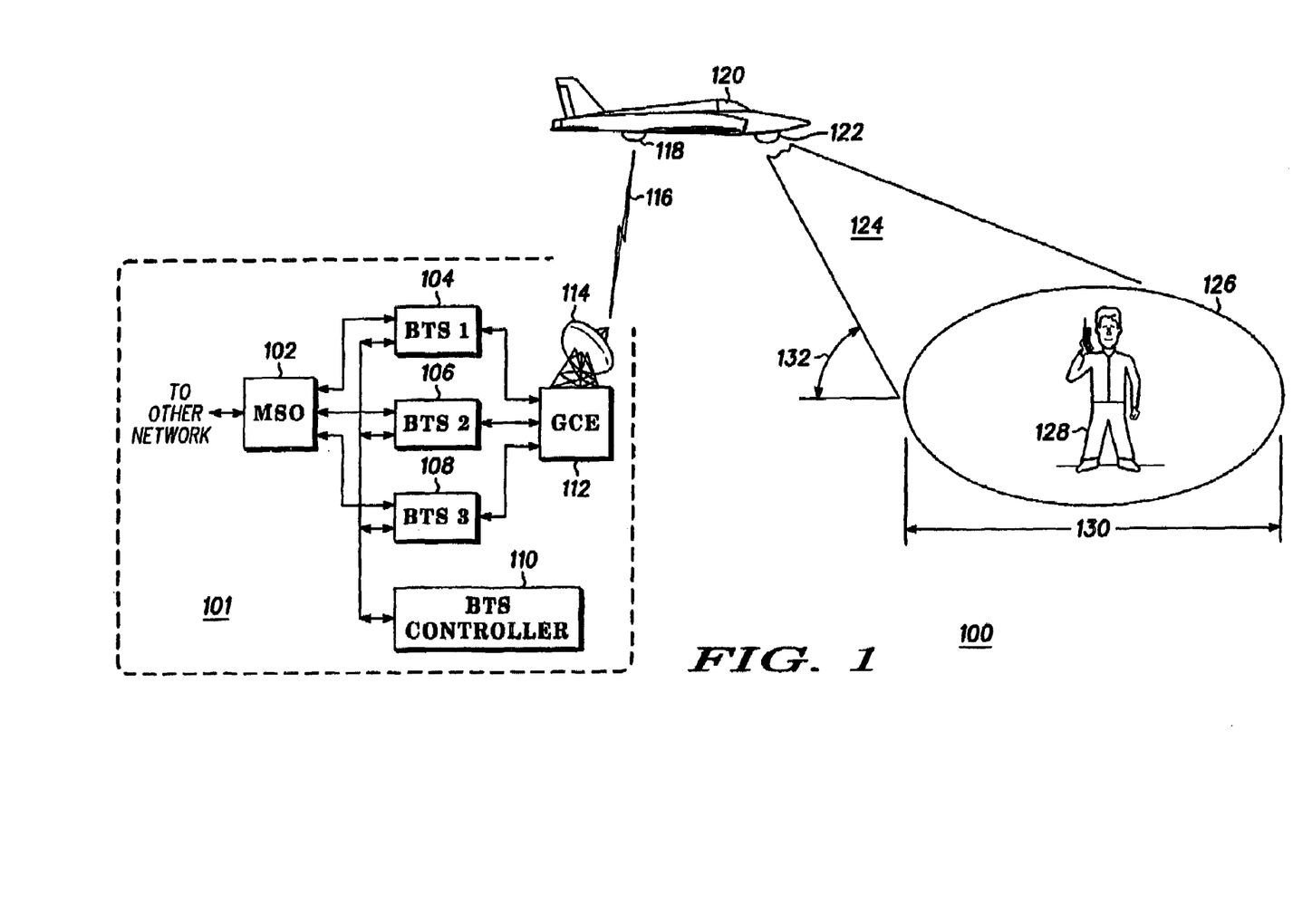
FIG. 1 shows a diagram of a communications system in accordance with a preferred embodiment of the present invention.

Turning now to the drawings in which like reference characters indicate corresponding elements throughout the several views, attention is first directed to FIG. 1. FIG. 1 shows a diagram of a communications system in accordance with a preferred embodiment of the present invention. System 100 includes aircraft 120 having antennas 118 and 122. Aircraft 120 communicates with ground equipment 101 on communications link 116. Aircraft 120 also communicates with cellular communication units such as unit 128 using antenna beam 124. Aircraft 120 carries a payload that includes antennas 118 and 122, radio frequency (RF) amplifiers, RF converters, and possibly analog-to-digital (A/D) and digital-to-analog (D/A) converters. The payload's antennas can be phased array antennas, horns, reflectors, patch antennas, or the like. The payload also includes computing equipment that functions to control the payload antennas, converters, and other equipment.

As used herein, the term "communication unit" means portable, mobile, or fixed communication equipment that sends and/or receives information over a wireless link to and/or from a transceiver, receiver, and/or transmitter of system 100. A communication unit can be, for example, a cellular telephone, pager, radio, computer terminal or any other electronic device or network that sends and/or receives data over a wireless link.

Aircraft 120 provides cellular communications services to communication units within beam 124. Communication units within beam 124 can be within region 126 on the ground or in the air. For ease of discussion, the methods and apparatus of the present invention are described as having communication units on the surface of the earth. In one embodiment, aircraft 120 serves as a repeater in the sky for a cellular network. Aircraft 120 receives cellular communications from communication units in beam 124, and it repeats them to ground equipment 101. Likewise, aircraft receives communications from ground equipment 101 on link 116 and repeats them to communication units in beam 124.

In a preferred embodiment, beam 124 includes cellular signals compatible with standard cellular communication units. For example, beam 124 can include signals that support a time division multiple access (TDMA, e.g. IS-136, GSM), code division multiple access (CDMA, e.g. IS-95), or any other type of digital or analog protocol. In other embodiments, beam 124 includes signals compatible with the Personal Communications Service (PCS) in the 1900 MHz band, or with the Integrated Digital Enhanced Network (IDEN). Communications system 100 can also be used for third generation cellular systems such as Universal Mobile Telecommunications System (UMTS) or CDMA-2000 as well as broadband data systems such as Local Multipoint Distribution Systems (LMDS).

As previously described, aircraft 120 serves as a repeater to provide cellular services from ground equipment 101 to region 126. Aircraft 120 can be, for example, an airplane, helicopter, balloon, dirigible, or any piloted or unmanned, fixed wing, rotor wing or lighter-than-air vehicle that is capable of carrying a payload. In a preferred embodiment, aircraft 120 is a fixed wing airplane.

Ground equipment 101 includes base transceiver stations (BTS) 104, 106, and 108, and ground conversion equipment 112. BTS 104, 106, and 108 are coupled to mobile switching office (MSO) 102, which is coupled to other networks (not shown), such as the public switched telephone network (PSTN). In some embodiments, BTS 104, 106, and 108 are also coupled to BTS controller 110. In these embodiments, BTS controller 110 monitors the call load of each BTS coupled thereto, and it assigns calls accordingly.

Ground equipment 101 also includes ground conversion equipment (GCE) 112. GCE 112 converts terrestrial format cellular signals received from BTSs 104, 106, and 108 to a frequency suitable for transmission to aircraft 120. In one embodiment, GCE 112 upconverts 800 MHz signals received from the BTSs to C-band for transmission to aircraft 120, and it downconverts C-band signals received from aircraft 120 and sends them to the BTSs. In this embodiment, the payload on aircraft 120 includes a repeater that converts from C-band to the 800 MHz band.

BTSs similar to those shown in FIG. 1 are commonly used in terrestrial cellular systems. When BTSs are used in terrestrial applications, each typically services one sector of a cell. When an increase in capacity is desired, a cell can be subdivided into a greater number of sectors, and each new sector can be serviced by an additional BTS, thereby increasing the capacity of the system. In these applications, sectors service geographically distinct areas, usually wedge shaped areas emanating radially from a cell site.

In contrast various embodiments of the present invention employ multiple BTSs to increase capacity in a common geographical area. For example, in the embodiment shown in FIG. 1, BTSs 104, 106, and 108 each communicate with cellular communication units in beam 124. Beam 124 covers region 126 on the surface of the earth, and each of BTS 104, 106, and 108 are equally capable of sending and receiving signals to communication units within region 126. Ground equipment 101 is shown having three BTSs. Some embodiments have more than three, and some have less. The number of BTSs employed determines a number of "sectors" used in beam 124. The term "sectors" used in this context does not refer to geographically separated areas served by a terrestrial cell site; rather, it refers to a logical entity used to increase call capacity. For example, in the embodiment of FIG. 1, three sectors (corresponding to the three BTSs) all serve the same geographical area, namely region 126. In an embodiment with a fourth BTS in ground equipment 101, four sectors would serve region 126.

Each BTS has multiple resources that are subject to capacity constraints. For example, each BTS is capable of carrying a maximum number of cellular calls. When this maximum number of calls is exceeded, calls are dropped or denied. Also for example, each BTS typically has an access channel and a control channel. The control channel broadcasts information to communication units, which then request traffic channels on the access channel.

In terrestrial cellular systems that have sectors serving separate geographic areas, communication units typically receive a single control channel much stronger than any others, and that determines which sector (and which BTS) the communication unit communicates with. The communication unit requests service on the access channel corresponding to the sector, and the corresponding BTS services the request.

Some terrestrial cellular systems, such as those compatible with IS-136, utilize "access classes" to control loading on access channels. Access classes are used in cellular systems as a means of flow control at the subscriber interface. In GSM and IS-136, a scheme is used whereby ten access classes are allocated to everyday users and a few special access classes are used for other than everyday users. Each communication unit is assigned an access class. The control channel broadcasts a list of "enabled" access classes, and only communication units with access classes that are on the list are allowed to request service on the access channel. When the loading on the access channel reaches a predetermined level, an access class is removed from the list, effectively denying service to communication units having that access class assigned. This keeps loading on the access channel to an acceptable level.

Access channels and control channels in communications system 100 operate differently than in the terrestrial cellular example above, in part because multiple sectors are assigned to the same beam, and therefore serve the same geographical area. In some embodiments, each access channel is associated with a control channel, and access class lists are used to influence relative loading on access channels. In other embodiments, a single control channel is associated with multiple access channels, and communication units are free to select any of the multiple access channels. In these embodiments, the relative loading of BTSs can be influenced by the action of a BTS controller.

Figure 2:
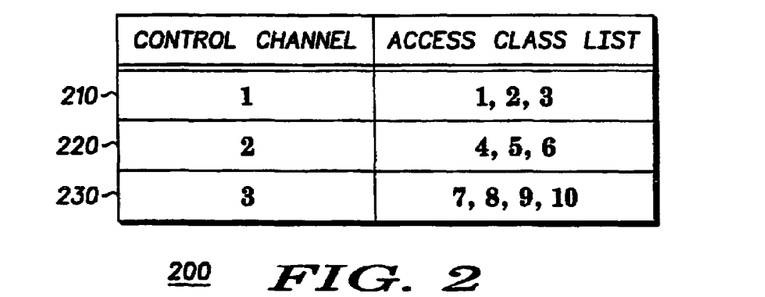
FIG. 2 shows a list of access class assignments in accordance with one embodiment of the present invention.

FIG. 2 shows a list of access class assignments in accordance with one embodiment of the present invention. Table 200 shows lists of enabled access classes for each of BTSs 104, 106, and 108 (FIG. 1). List 210 corresponds to control channel one, which in turn corresponds to BTS 104, and lists 220 and 230 correspond in a like manner to BTS 106 and 108 respectively. In the embodiment shown in FIG. 2, a different subset of access classes is assigned to each sector. The total set of access classes includes access classes one through ten, the total set is divided into unique subsets, and each subset is assigned to a different sector. For example, control channel one is assigned an access class list that includes access classes one through three, control channel two is assigned access classes four through six, and control channel three is assigned access classes seven through ten.

The access class assignments shown in table 200 correspond to a system having three sectors and ten access classes. In other embodiments, more than three sectors exist, and more than ten access classes exist. In still other embodiments, less than three sectors exist and less than ten access classes exist. Any number of sectors and access classes can exist in combination without departing from the scope of the present invention.

A communication unit within beam 124, such as unit 128, receives all three control channels and the associated lists of enabled access classes. When cellular service is desired, the communication unit requests a traffic channel, or "service," on the access channel corresponding to the control channel having the enabled access class. For example, if unit 128 is assigned access class five, unit 128 will request service on access channel two because access class five is only enabled in control channel two. Likewise, if unit 128 is assigned access class three, it will request service on access channel one, and if unit 128 is assigned access class seven, it will request service on access channel three. As a result of the distribution of access class assignments across the various sectors, the loading on the access channels is also distributed.

In one embodiment, BTS controller 110 (FIG. 1) performs the assignment of access classes to each of BTSs 104, 106, and 108. BTS controller 110 measures the load on all BTSs within the system, and makes the access class assignments accordingly. If one access channel overloads before another, BTS controller 110 can remove an access class assignment from the corresponding control channel and reassign it to another, more lightly loaded, sector. For example, in the embodiment of FIG. 2, if the access channel of sector three becomes overloaded, access class ten can be reassigned to either sector one or sector two. BTS controller 110 can also remove an access class from any control channel without reassigning it when the entire load is too great.

In another embodiment, BTS controller 110 does not exist and the access class assignments shown in table 200 are maintained by each BTS. Each BTS maintains its own access class list, and removes access classes as overload conditions occur.

Figure 3:
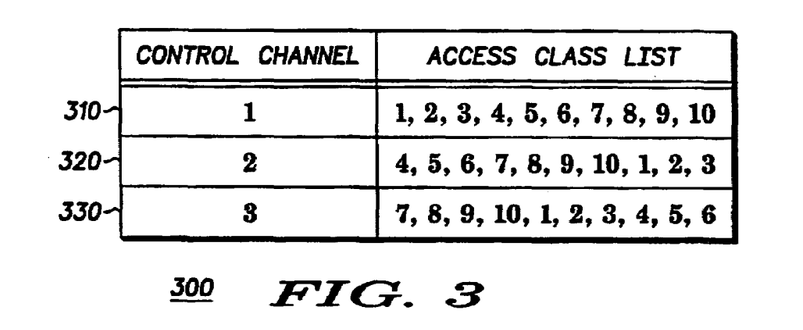
FIG. 3 shows a list of access class assignments in accordance with another embodiment of the present invention.

FIG. 3 shows a list of access class assignments in accordance with another embodiment of the present invention. Table 300 shows access class lists 310, 320, and 330, corresponding to BTSs 104, 106, and 108, respectively. In the embodiment shown in FIG. 3, each sector is assigned a complete list of access classes in a different priority order. The complete set of access classes includes access classes one through ten. Sector one is assigned the complete set with access class one having the highest priority, sector two is assigned the complete set with access class four having the highest priority, and sector three is assigned the complete set with access class seven having the highest priority.

In this embodiment, each BTS can independently control its associated access list. When an overload condition occurs in a sector, the corresponding BTS can remove an access class in reverse priority order. For example, if access channel one experiences an overload condition, access class ten can be removed from list 310. Because each of the sectors has access classes assigned in different priority order, as each removes access classes, the load tends to distribute evenly across all of the sectors.

As can be seen from table 300, during periods of heavy loading, certain access classes will be completely removed from the access class lists before others. For example, access class three will be removed before access class one, and access class six will be completely removed before access class four. In some embodiments, access classes are grouped into categories to allow more even priority treatment between these access classes. For example, in control channel one, access classes one, two, and three can be categorized as primary within control channel one. Likewise, access classes four, five, and six can be categorized as primary in control channel two, and access classes seven, eight, nine, and ten can be categorized as primary in control channel three. All other access classes can then be categorized as secondary. In one embodiment, within each control channel, secondary access classes are removed in reverse priority order as explained above, and then primary access classes are removed in a random order, thereby assuring more even priority treatment overall.

As previously described, each BTS can implement the load sharing autonomously, and BTS controller 110 (FIG. 1) is not necessary. This can be useful in part because existing cellular ground station configurations that do not include a BTS controller can be utilized for the present invention with little or no modification. In some embodiments, software in each BTS can be used to setup initial access class lists, control load sharing within each sector by controlling the load sharing access classes, and provide overload control by removing load sharing access classes and using overload access classes to control the load.

Figure 4:
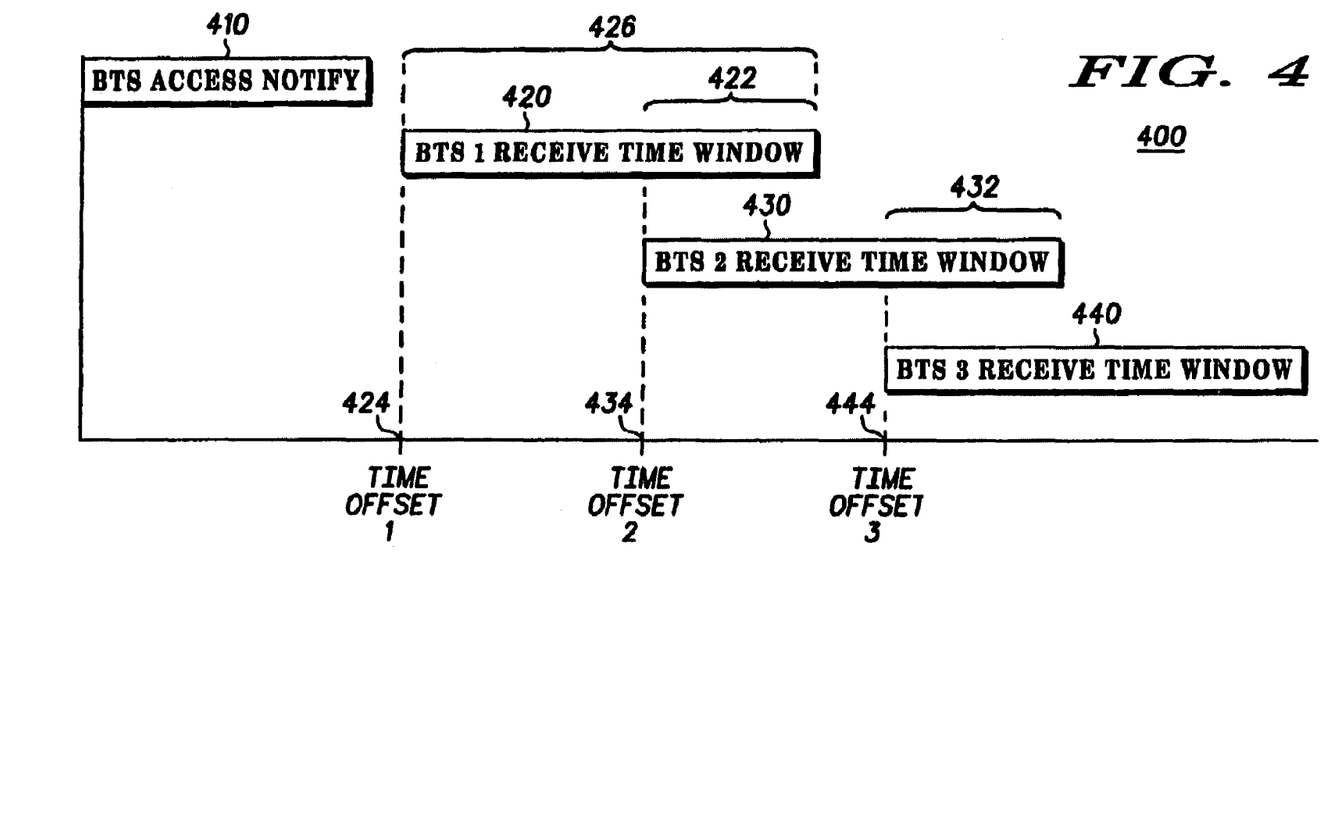
FIG. 4 shows a timeline of base transceiver station receive time windows in accordance with a preferred embodiment of the present invention.

FIG. 4 shows a timeline of base transceiver station receive time windows in accordance with a preferred embodiment of the present invention. Timeline 400 shows BTS access notify 410 at time zero. In one embodiment, BTS access notify 410 corresponds to control channels one through three broadcasting access class lists. In other embodiments, BTS access notify 410 corresponds to a broadcast from a single control channel. Timeline 400 also shows receive time windows 420, 430, and 440. Receive time window 420 shows the time during which BTS 104 (FIG. 1) monitors access channels one through three for service requests. Likewise, receive time window 430 shows the time during which BTS 106 monitors access channels one through three, and receive time window 440 shows the time during which BTS 108 monitors access channels one through three.

Time offset one, shown at time 424 in FIG. 4, is a time offset programmed into BTS 104. The time location 426 of receive time window 420 is defined by time offset one and the duration of receive time window 420. Likewise, the time locations 434, 444 of receive time windows 430 and 440 are defined by time offsets two and three, and by the duration of the respective receive time windows.

In terrestrial systems, the time offsets programmed into BTSs are typically all equal, and they represent the minimum time between the control channel broadcast and a service request from a communication unit. This normally includes the roundtrip signal propagation time between the BTS and the closest possible communication unit, and the minimum processing time within the communication unit. The length of the receive time window determines how far away a communication unit can be from the BTS and still receive service. In systems compatible with the IS-136 TDMA standard, the size of the receive time window allows the farthest communication unit to be approximately 92 km farther away than the nearest communication unit. In other words, the lamest area that corresponds to the receive time window is approximately 92 km in length.

As previously described, length 130 (FIG. 1) of region 126 is a function of the altitude of aircraft 120, and also of elevation angle 132. Different receive time window locations are useful when the altitude of aircraft 120 is low, when elevation angle 132 is small, or both, causing length 130 to be larger than the maximum distance serviceable by a single BTS. When length 130 is greater than approximately 92 km, multiple receive time windows can effectively increase the size of the region that can be provided with cellular service. One such embodiment is shown in FIG. 5.

Figure 5:
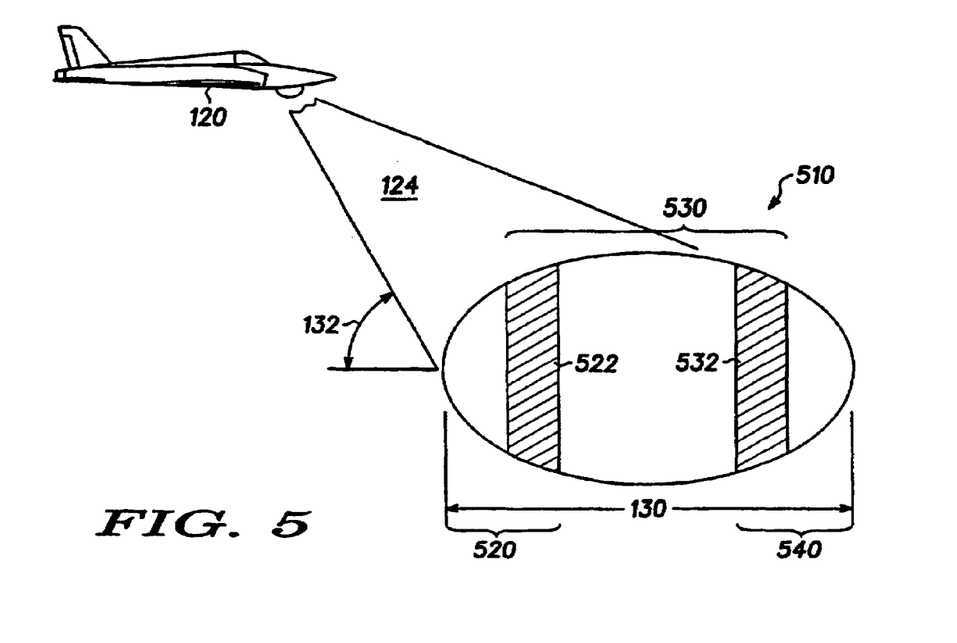
FIG. 5 shows a beam footprint in accordance with a preferred embodiment of the present invention.

FIG. 5 shows a beam footprint in accordance with a preferred embodiment of the present invention. Beam 124 creates beam footprint 510 on the surface of the earth. Beam footprint 510 includes three regions, one corresponding to each of BTS 104, 106, and 108. Region 520 corresponds to receive time window 420, region 530 corresponds to receive time window 430, and region 540 corresponds to receive time window 540. A service request from a communication unit residing in region 520 will arrive at the BTSs during receive time window 420. Likewise, a service request from a communications device within region 530 will arrive at the BTSs during receive time window 430, and a service request from a communications device within region 540 will arrive at the BTSs during receive time window 440.

In some embodiment, multiple control channels are broadcast in beam 124, and communication units are free to respond in any access channel. In these embodiments, each BTS can have a control/access channel pair, such that there is a one-to-one relationship between control channels and access channels. In a preferred embodiment, a single control channel is broadcast in beam 124, such that a one any relationship exists between the control channel and the access channels.

Receive time windows 420, 430, and 440 intersect at overlap times 422 and 432. These overlap times correspond to overlap regions 522 and 532 on the surface of the earth. Service requests from communication units within overlap region 522 arrive at the BTSs during overlap time 422, and they can be serviced by either BTS 104 or BTS 106. In some embodiments, one of the two BTSs has priority and always services the call if capacity is available. In other embodiments, BTS controller 110 assigns the service request to one of the two BTSs. For example, BTS controller 110 can assign the service request to the BTS having a lighter current call load. In a like manner, service requests from communication units within region 532 arrive at the BTSs during overlap time 432, and they can be serviced by either BTS 106 or BTS 108.

In one embodiment, load sharing between BTSs is accomplished by transferring calls involving a communication unit in an overlap region from one BTS to another. For example, if BTS 104 and BTS 106 are both handling calls, and BTS 104 begins to experience an overload, calls involving communication units in overlap region 522 can be transferred from BTS 104 to BTS 106. This can continue until BTS 106 is handling all calls involving a communication unit within region 522.

Load sharing between BTSs can also be accomplished by modifying time offsets in the various BTSs. For example, if in the previous example all calls in overlap region 522 are transferred from BTS 104 to BTS 106, and BTS 104 is still experiencing an overload condition, time offset two can be reduced to move receive time window 430 earlier in time and to move overlap region 522 further into region 520. By increasing the size of overlap region 522, more calls currently handled by BTS 104 become eligible for transfer to BTS 106.

Load sharing between BTSs has been described with respect to embodiments having three BTSs and one beam. In other embodiments, each beam is served by more than three BTSs, and the number of regions in the beam and the number of overlap regions increase accordingly. For example, in an embodiment with five BTSs serving a single beam, five regions corresponding to regions 520, 530, and 540 would exist, and four regions of overlap would exist. Further, time offsets can be modified such that regions of overlap occur at the intersection of more than two receive time windows.

Figure 6:
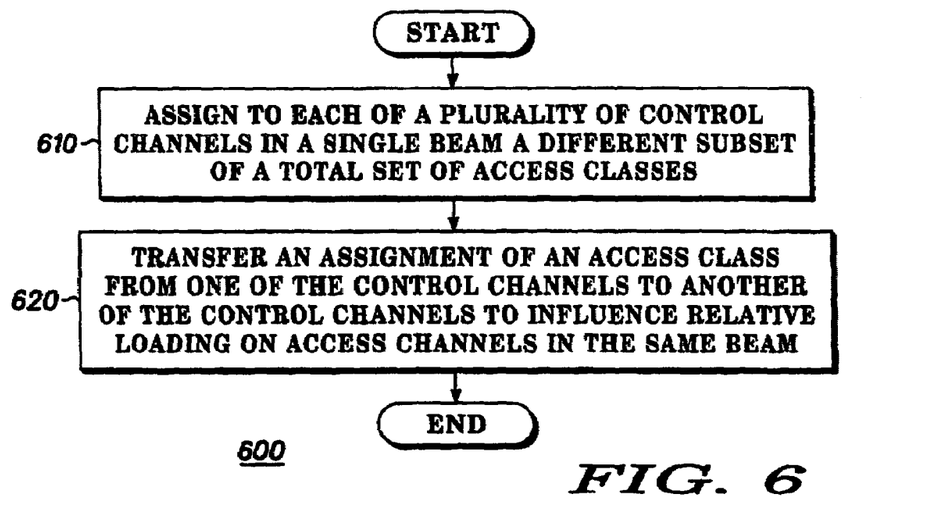
FIG. 6 is a flowchart of a method for influencing the relative loading on a plurality of access channels in a single beam in accordance with one embodiment of the present invention.

FIG. 6 is a flowchart of a method for influencing the relative loading on a plurality of access channels in a single beam in accordance with one embodiment of the present invention. Method 600 begins in block 610 when a different subset of a total set of access classes is assigned to each of a plurality of control channels in a single beam. In one embodiment, the action of block 610 produces multiple subsets of access classes such as those shown in FIG. 2. In this embodiment, the total set of access classes includes access classes one through ten. In other embodiments, subsets other than those shown in FIG. 2 are produced.

In block 620, the relative loading on access channels is influenced by transferring the assignment of an access class from one of the control channels to another. For example, in the embodiment shown in FIG. 2, the relative loading of access channels can be influenced by transferring an access class assignment from one list to another. Also for example, access class three can be transferred from list 210 to list 220, thereby transferring a portion of the total load from the access channel corresponding to list 210 to the access channel corresponding to list 220.

In other embodiments, access classes are removed from lists without being transferred to other lists. For example, in the embodiment shown in FIG. 2, if all access channels are heavily loaded and the access channel corresponding to list 230 begins to overload, any of access classes seven through ten can be removed from list 230. As the load reduces, the access class previously removed can be replaced, either in the list from which it was removed or in a different list.

Figure 7:
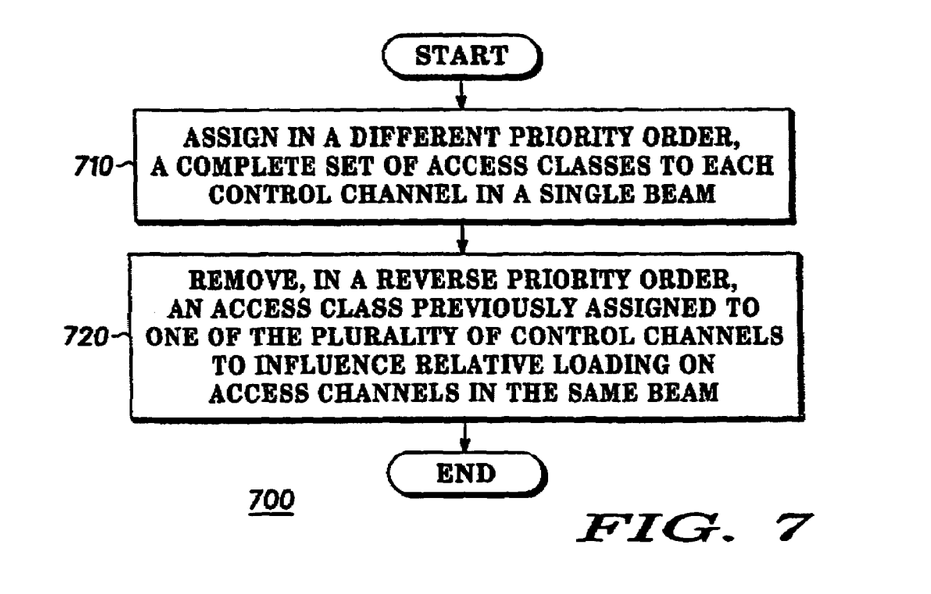
FIG. 7 is a flowchart of a method for influencing the relative loading on a plurality of access channels in a single beam in accordance with another embodiment of the present invention.

FIG. 7 is a flowchart of a method for influencing the relative loading on a plurality of access channels in a single beam in accordance with another embodiment of the present invention. Method 700 begins in block 710 when a complete set of access classes is assigned to each control channel in a single beam. The complete set of access classes is assigned to each control channel in a different priority order. For example, in the embodiment shown in FIG. 3, each of lists 310, 320, and 330 include a complete set of access classes in different priority order. List 310 has access class one as the highest priority and access class ten as the lowest priority. List 320 has access class four as the highest priority access class, and has access class three as the lowest priority access class. List 330 has access class seven as the highest priority access class, and has access class six as the lowest priority access class.

In block 720, the relative loading of access channels is influenced by removing access classes previously assigned to the control channels. Access classes are removed in a reverse priority order. For example, in the embodiment shown in FIG. 3, access classes are removed from the lists starting with the lowest priority access class. The load on the access channel corresponding to list 320 can be reduced by removing access classes from list 320 starting with access class three. Likewise, the load on access channels corresponding to lists 310 and 330 can be reduced by removing access classes ten and six respectively.

The actions in block 720 can be accomplished in a system such as communications system 100 (FIG. 1). In one embodiment, system 100 includes a BTS controller that aids in the determination of which access class lists to modify, and also which access classes to remove. In another embodiment, system 100 does not include a BTS controller, and each BTS determines autonomously which access classes to remove from a list, and when.

Figure 8:
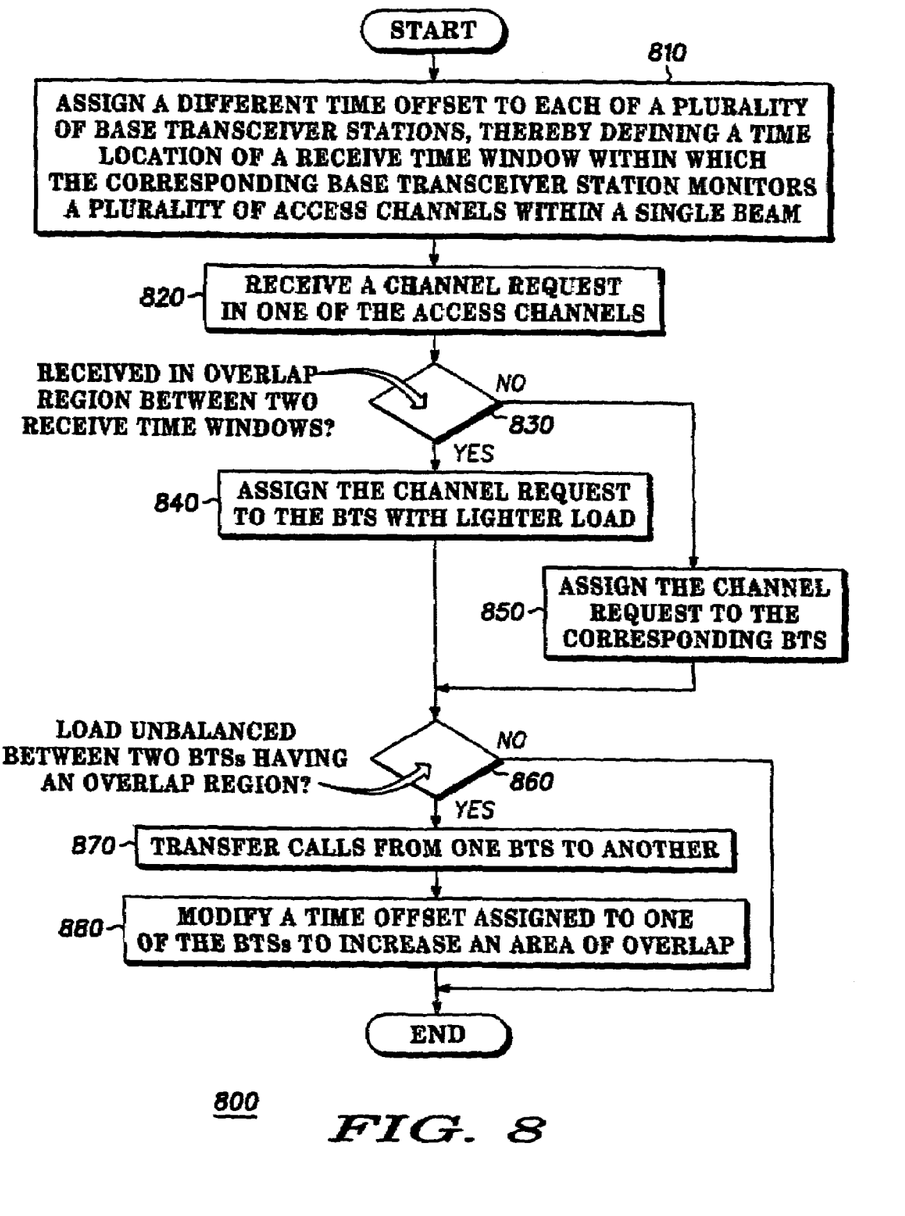
FIG. 8 is a flowchart of a method for influencing relative loading on a plurality of base transceiver stations in accordance with a preferred embodiment of the present invention.

FIG. 8 is a flowchart of a method for influencing relative loading on a plurality of base transceiver stations in accordance with a preferred embodiment of the present invention. Method 800 begins in block 810 when a different time offset is assigned to each of a plurality of base transceiver stations. Each time offset defines a time location of a receive time window within which the corresponding base transceiver station monitors access channels within a single beam. The actions of block 810 correspond to the receive time windows shown in FIG. 4. This embodiment includes three base transceiver stations, three time offsets, and three receive time windows.

In block 820, a channel request is received in one of the access channels. The channel request can be in response to a broadcast in any number of control channels. For example, in one embodiment, a single control channel is broadcast, and a communication unit can perform a channel request in any of the access channels. In another embodiment, control channels and access channels form pairs, and communication units perform channel requests in the access channel corresponding to a detected control channel. The channel request is received from a communication unit requesting a traffic channel on which to communicate. In one embodiment, such as the embodiment shown in FIG. 5, the communication unit requesting a traffic channel can be physically located such that its channel request can be handled by one or more base transceiver stations.

Decision block 830 determines whether the channel request is received in an overlap region between two receive time windows. If not, the channel request is assigned to the corresponding base transceiver station. For example, if the channel request was received in receive time window 420 outside of overlap time 422, BTS 104 would be assigned to the channel request as a result of the actions in block 850. If, however, the channel request is received in an overlap region between two receive time windows, the channel request is assigned to the BTS having the lighter load in block 840. In the embodiment shown in FIG. 5, this corresponds to a communication unit located within overlap region 522 or 532. If the communication unit is within overlap region 522, either BTS 104 or BTS 106 can be assigned the channel request as a result of the actions in block 840.

Decision block 860 determines whether the load is unbalanced between two base transceiver stations sharing an overlap region. If not, the load balance between adjacent base transceiver stations is satisfactory, and method 800 ends. If the load is unbalanced, calls are transferred from one BTS to another in block 870. In addition, a time offset can be modified to increase an area of overlap between two receive time windows. For example, in the embodiment of FIG. 5, calls involving communication units in overlap region 532 can be transferred between BTS 106 and BTS 108 to influence the loading between the two BTSs. In addition, either or both of time offset two and time offset three (FIG. 4) can be modified to increase the size of overlap region 532, thereby increasing the number of calls that are candidates for transfer between BTS 106 and BTS 108.

In summary, the methods and apparatus of the present invention provide a mechanism for influencing the relative loading between access channels in a single beam. The methods and apparatus of the present invention also provide a mechanism for influencing the relative loading between base transceiver stations. While we have shown and died specific embodiments of the present invention, further modifications and improvements will occur to those skilled in the art.

We desire it to be understood, therefore, that this invention is not limited to the particular forms shown and we intend in the appended claims to cover all modifications that do not depart from the spirit and scope of this invention.

What is claimed is:

1. A communications apparatus comprising:
a plurality of base transceiver stations, each having a control channel associated therewith; and
a non-terrestrial repeater having a first antenna to receive information from the plurality of base transceiver stations, and a second antenna to project a beam on the earth;
wherein the beam includes the control channel from each of the plurality of base transceiver stations and each of the control channels has an access channel associated therewith, and wherein each of the control channels is assigned a list of access classes that are modified to influence a relative loading between access channels.

2. The communications apparatus of claim 1 wherein each list of access classes is assigned in a different priority order.

3. The communications apparatus of claim 2 wherein each of the plurality of base transceiver stations is configured to remove an access class from the associated list of access classes in reverse priority order to reduce loading on the associated access channel.

4. The communications apparatus of claim 1 wherein each list of access classes is a unique subset of a total set of access classes.

5. The communications apparatus of claim 4 wherein each of the plurality of base transceiver stations is configured to remove an access class from the associated list of access classes in random order to reduce loading on the associated access channel.

6. A communications apparatus comprising:
a plurality of base transceiver stations, each having a control channel associated therewith; and
a non-terrestrial repeater having a first antenna to receive information from the plurality of base transceiver stations, and a second antenna to project a beam on the earth;

wherein the beam includes the control channel from each of the plurality of base transceiver stations and each of the plurality of base transceiver stations has a receive time window and a time offset associated therewith, a time location of the receive time window being a function of the time offset, such that the receive time window defines an area within the beam from which an associated base transceiver station receives communications.

7. The communications apparatus of claim 6 wherein:
each control channel has an access channel associated therewith; and
each of the plurality of base transceiver stations is configured to be responsive to each access channel, and to receive communications occurring within the associated receive time window in each access channel.

8. The communications apparatus of claim 6 further comprising a controller coupled to each of the plurality of base transceiver stations, the controller being configured to alter time offsets to influence the relative load of each of the plurality of base transceiver stations.

9. The communications apparatus of claim 8 wherein the controller is configured to assign lists of access classes to each of the control channels to influence the relative load of each access channel.

10. A method comprising in a communications system having a plurality of control channels projected in a single beam, influencing relative loading on a plurality of access channels in the single beam;
performing access class assignments to each of the plurality of control channels; and
modifying the access class assignments to influence loading on the plurality of access channels.

11. The method of claim 10 wherein performing access class assignments includes:
assigning to each of the plurality of control channels a different subset of a total set of access classes.

12. The method of claim 11 wherein modifying the access class assignments includes:
transferring an assignment of one access class from one of the plurality of control channels to another of the plurality of control channels.

13. The method of claim 10 wherein performing access class assignments includes:
assigning a complete set of access classes to each control channel, wherein the complete set of access classes is assigned to each of the plurality of control channels in a different priority order.

14. The method of claim 13 wherein modifying the access class assignments includes:
removing an access class previously assigned to one of the plurality of control channels, wherein the removing is performed in a reverse priority order.

15. A method comprising in a communications system having a plurality of base transceiver stations, and a plurality of access channels in a single beam, influencing relative loading on the plurality of base transceiver stations, assigning a different time offset to each of the plurality of base transceiver stations, wherein the different time offset for each of the plurality of base transceiver stations defines a time location of a receive time window within which the corresponding base transceiver station monitors the plurality of access channels.

16. The method of claim 15 wherein assigning a different time offset comprises:
assigning a different time offset to each of the plurality of base transceiver stations such that at least two time locations of receive time windows overlap in time, producing at least one area of overlap in the beam.

17. The method of claim 16 further comprising:
when a channel request is received in one of the plurality of access channels by a first base transceiver station having a first load and by a second base transceiver station having a load larger than the first load, assigning the channel request to the first base transceiver station.

18. The method of claim 16 wherein a first base transceiver station having a first load has a receive time window overlapping with a receive time window of a second base transceiver station having a second load, the method further comprising:
when the second load exceeds the first load, reassigning calls from the second base transceiver station to the first base transceiver station.

19. The method of claim 18 further comprising changing a time offset assigned to one of the first base transceiver station and the second base transceiver station to increase a size of the at least one area of overlap in the beam.

20. The method of claim 15 further comprising broadcasting one control channel in the single beam, such that a one-to-many relationship exists between the one control channel and the plurality of access channels.

* * * * *